United States Patent
Chengson et al.

(10) Patent No.: US 7,924,862 B2
(45) Date of Patent: *Apr. 12, 2011

(54) SYSTEMS AND METHODS FOR REDUCING REFLECTIONS AND FREQUENCY DEPENDENT DISPERSIONS IN REDUNDANT LINKS

(75) Inventors: David Chengson, Scotts Valley, CA (US); Jaya Bandyopadhyay, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/687,593

(22) Filed: Jan. 14, 2010

(65) Prior Publication Data

US 2010/0118726 A1 May 13, 2010

Related U.S. Application Data

(63) Continuation of application No. 10/405,341, filed on Apr. 3, 2003, now Pat. No. 7,724,761, which is a continuation-in-part of application No. 09/521,281, filed on Mar. 7, 2000, now Pat. No. 6,646,982.

(51) Int. Cl.
*H04L 12/28* (2006.01)
*H04L 12/56* (2006.01)
*H04L 12/66* (2006.01)

(52) U.S. Cl. ..................... 370/419; 370/463

(58) Field of Classification Search ............... None
See application file for complete search history.

(56) References Cited

U.S. PATENT DOCUMENTS

| | | | |
|---|---|---|---|
| 3,288,930 A | 11/1966 | Johnson | |
| 3,434,002 A | 3/1969 | Johnson | |
| 3,676,839 A | 7/1972 | Wohl et al. | |
| 3,944,853 A | 3/1976 | Cooper | |
| 3,984,824 A | 10/1976 | Blackburn | |
| 4,283,788 A | 8/1981 | Tamburelli | |
| 4,561,012 A | 12/1985 | Acampora | |
| 4,914,429 A | 4/1990 | Upp | |
| 5,048,009 A | 9/1991 | Conrad | |
| 5,062,703 A | 11/1991 | Wong et al. | |
| 5,227,644 A | 7/1993 | Ueno | |
| 5,289,303 A | 2/1994 | Cloonan et al. | |
| 5,303,078 A | 4/1994 | Brackett et al. | |
| 5,367,540 A | 11/1994 | Kakuishi et al. | |
| 5,371,495 A | 12/1994 | Sturges et al. | |

(Continued)

OTHER PUBLICATIONS

Co-pending U.S. Appl. No. 10/405,341, filed Apr. 3, 2003; David Chengson et al., entitled "Systems and Methods for Reducing Reflections and Frequency Dependent Dispersions in Redundant Links".

*Primary Examiner* — Salman Ahmed
*Assistant Examiner* — Blanche Wong
(74) *Attorney, Agent, or Firm* — Harrity & Harrity, LLP

(57) ABSTRACT

A network device includes a group of high speed redundant transmission lines and a switch. The switch is configured to select one of the high speed redundant transmission lines. The switch causes reflections and frequency dependent dispersions in the selected high speed redundant transmission line. The network device further includes a transmitting device that is configured to adjust signals transmitted over the selected high speed redundant transmission line so as to reduce the reflections and frequency dependent dispersions.

20 Claims, 8 Drawing Sheets

U.S. PATENT DOCUMENTS

| | | |
|---|---|---|
| 5,418,785 A | 5/1995 | Olshansky et al. |
| 5,608,562 A | 3/1997 | Delavaux et al. |
| 5,623,377 A | 4/1997 | Behrens et al. |
| 5,771,320 A | 6/1998 | Stone |
| 6,018,246 A | 1/2000 | Dunsmore et al. |
| 6,167,082 A | 12/2000 | Ling et al. |
| 6,266,379 B1 | 7/2001 | Dally |
| 6,356,163 B1 | 3/2002 | Dunsmore et al. |
| 6,553,445 B1 | 4/2003 | Drapkin et al. |
| 6,646,982 B1 | 11/2003 | Chengson et al. |
| 6,665,352 B2 | 12/2003 | Lerner et al. |
| 6,704,438 B1 | 3/2004 | Alexandru |
| 6,847,267 B2 | 1/2005 | Flake et al. |
| 7,054,296 B1 | 5/2006 | Sorrells et al. |

# SYSTEMS AND METHODS FOR REDUCING REFLECTIONS AND FREQUENCY DEPENDENT DISPERSIONS IN REDUNDANT LINKS

RELATED APPLICATIONS

The present application is a Continuation of U.S. patent application Ser. No. 10/405,341, filed Apr. 3, 2003, which is a Continuation-in-Part of U.S. patent application Ser. No. 09/521,281, filed Mar. 7, 2000, the contents of which are incorporated by reference in their entirety herein.

BACKGROUND OF THE INVENTION

1. Field of the Invention

The present invention relates generally to data transfer, and more particularly, to systems and methods for reducing distortions in data transferred over high speed links.

2. Description of Related Art

A communications bus can be used to couple electrical components in a network device. Optimally, the communications bus should be transparent to the components that it interconnects. A source synchronous communications bus can be used to couple a transmitting component to one or more receiving components. In a source synchronous communications link, the transmitting component provides a source clock signal that can be used by the receiving component to synchronize the reading of data from the communications link.

When the network device is to be used in mission critical environments (i.e., environments where the continuous operability of the network device is critical), redundancy may be built into the network device. Previous redundant source synchronous links that use switches for redundancy typically maintain controlled lengths between the transmitting component and the switch and between the switch and the receiving component to compensate for the effects of voltage standing waves that occur from reflections caused by the switch. Such redundant source synchronous links are limited to medium speed operation (e.g., 250 megabits per second). These redundant source synchronous link designs are inadequate for operations in the 1 gigabit per second (or greater) range.

Accordingly, it is desirable to improve high speed signal transmissions in a network device.

SUMMARY OF THE INVENTION

Systems and methods consistent with the principles of the invention address this and other needs by providing a network device that uses pre-emphasis to compensate for signal distortions caused by the implementation of a redundant field effect transmitter (FET) switch in a high speed channel.

One aspect consistent with principles of the invention is directed to a method for performing pre-emphasis in a channel that includes high speed redundant links. The method includes characterizing the channel in the time domain to identify impedance discontinuities, characterizing the channel in the frequency domain to identify loss due to frequency dependent attenuations and dispersions, and performing pre-emphasis to compensate for the identified impedance discontinuities and frequency dependent attenuations and dispersions.

A second aspect consistent with principles of the invention is directed to a system that includes a receiving device, redundant drivers that are configured to transmit signals to the receiving device, and a switch. The switch is connected to the receiving device and the redundant drivers via high speed links and is configured to transmit signals from one of the redundant drivers based on a control signal. The switch causes distortions in the high speed links. Each of the redundant drivers is configured to compensate for the distortions caused by the switch.

A third aspect consistent with principles of the invention is directed to a network device. The network device includes a group of high speed redundant links and means for switching between the high speed redundant links. The means for switching causes distortions to signals transmitted over the high speed redundant links. The network device further includes means for compensating for the distortions prior to the signals being transmitted over the high speed redundant links.

A fourth aspect consistent with the principles of the invention is directed to a network device that includes a group of high speed redundant transmission lines and a switch that is configured to select a high speed redundant transmission line from the group of high speed redundant transmission lines. The switch causes reflections and frequency dependent dispersions in the selected high speed transmission line. The network device further includes a transmitting device that is configured to adjust signals transmitted over the selected high speed transmission line so as to reduce the reflections and frequency dependent dispersions.

A fifth aspect consistent with the principles of the invention is directed to a network device that includes a group of high speed, source synchronous buses, and a switch. The switch is configured to select one of the high speed, source synchronous buses and that switch causes reflections and frequency dependent dispersions in the selected high speed, source synchronous bus. The network device further includes a driver that is connected to the selected high speed, source synchronous bus and configured to transmit signals to a receiving device over the selected high speed, source synchronous bus. The driver is further configured to adjust the signals prior to transmission to compensate for the reflections and frequency dependent dispersions.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

As described herein, a network device uses pre-emphasis to compensate for signal distortions caused by the implementation of a redundant FET switch in a high speed channel.

System Configuration

Figure 1:
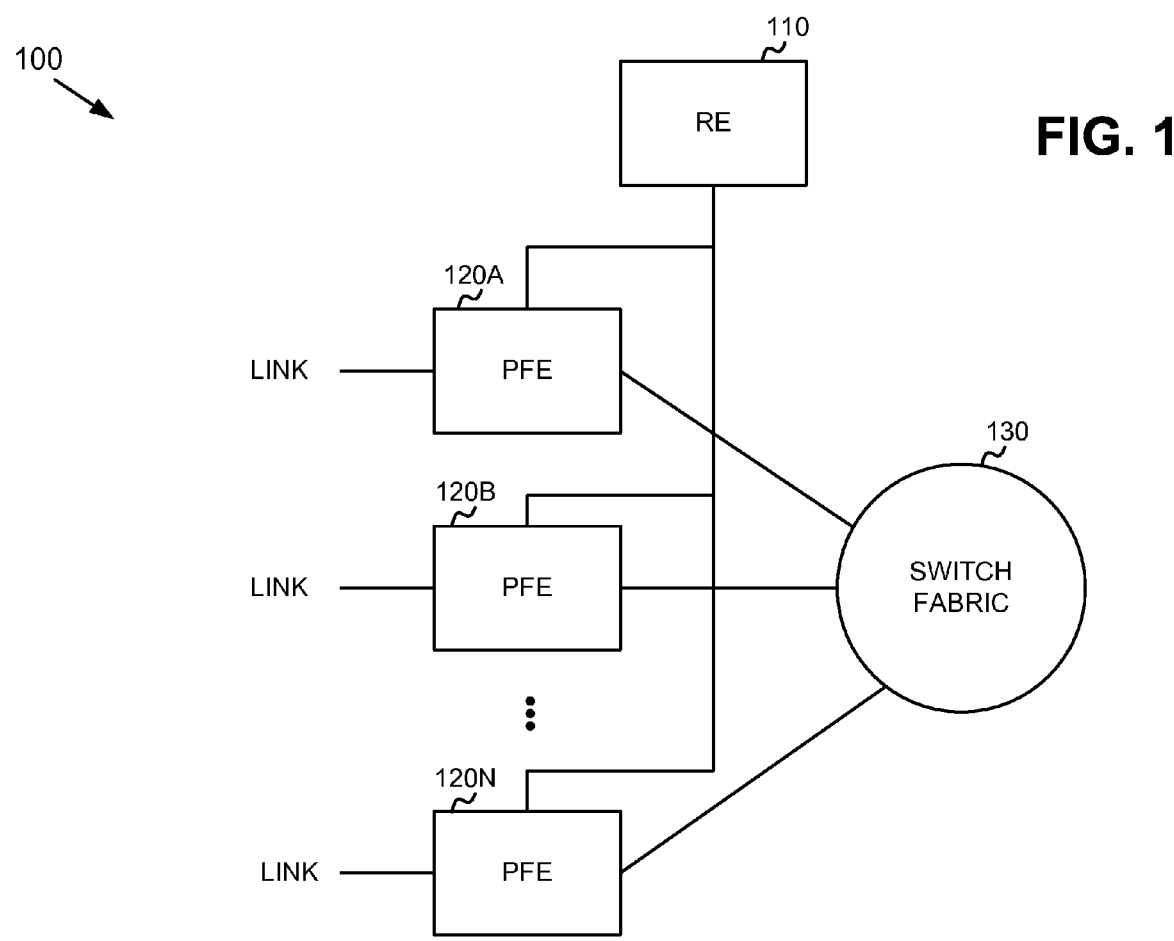
FIG. 1 is a block diagram illustrating an exemplary routing system in which systems and methods consistent with the principles of the invention may be implemented.

FIG. 1 is a block diagram illustrating an exemplary routing system 100 in which systems and methods consistent with the principles of the invention may be implemented. System 100 receives one or more packet streams from a physical link, processes the packet stream(s) to determine destination information, and transmits the packet stream(s) out on a link in accordance with the destination information. System 100 may include a routing engine (RE) 110, packet forwarding engines (PFEs) 120A, 120B, . . . , 120N (referred to collectively as "PFEs 120"), and a switch fabric 130.

RE 110 performs high level management functions for system 100. For example, RE 110 maintains the connectivity and manages information and data necessary for performing routing by system 100. RE 110 creates routing tables based on network topology information, creates forwarding tables based on the routing tables, and forwards the forwarding tables to PFEs 120. PFEs 120 use the forwarding tables to perform route lookup for incoming packets and perform the forwarding functions for system 100. RE 110 also performs other general control and monitoring functions for system 100.

PFEs 120 are each connected to RE 110 and switch fabric 130. PFEs 120 receive packet data on physical links connected to a network, such as a wide area network (WAN) or a local area network (LAN). Each physical link could be one of many types of transport media, such as optical fiber or Ethernet cable. The data on the physical link is formatted according to one of several protocols, such as the synchronous optical network (SONET) standard, an asynchronous transfer mode (ATM) technology, or Ethernet.

PFEs 120 may process incoming packet data prior to transmitting the data to another PFE or the network. PFEs 120 may also perform route lookup for the data using the forwarding table from RE 110 to determine destination information. If the destination indicates that the data should be sent out on a physical link connected to one of PFEs 120, then the PFE prepares the data for transmission by, for example, adding any necessary headers, and transmits the data from the port associated with the physical link. If the destination indicates that the data should be sent to another PFE via switch fabric 130, then PFE 120 prepares the data for transmission to the other PFE, if necessary, and sends the data to the other PFE via switch fabric 130.

Figure 2:
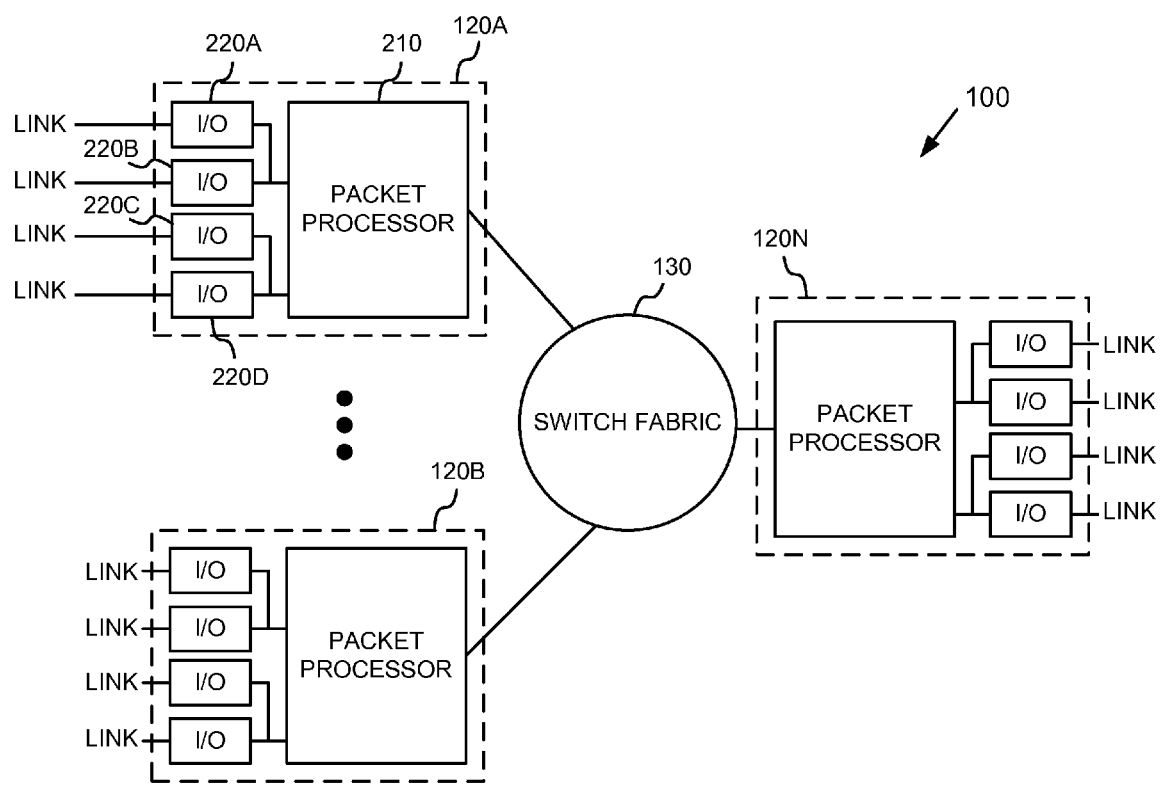
FIG. 2 is a detailed block diagram illustrating portions of the routing system of FIG. 1.

FIG. 2 is a detailed block diagram illustrating portions of routing system 100. PFEs 120 connect to one another through switch fabric 130. Each of PFEs 120 may include one or more packet processors 210 and pairs of redundant input/output (I/O) interfaces 220A-220D. Although FIG. 2 shows two pairs of redundant I/Os 220A and 220B and I/Os 220C and 220D connected to each of packet processors 210 and three packet processors 210 connected to switch fabric 130, in other embodiments consistent with principles of the invention there can be more or fewer I/Os 220 and packet processors 210.

Each of packet processors 210 performs routing functions and handles packet transfers to and from I/Os 220A-220D and switch fabric 130. For each packet it handles, packet processor 210 performs the previously-discussed route lookup function and may perform other processing-related functions.

I/Os 220A-220D may transmit data between a physical link and packet processor 210. In one implementation, each of I/Os 220A-220D may be a line card. Different pairs of I/Os may be designed to handle different types of network links. For example, one pair of I/Os may be an interface for an optical link while another pair of I/Os may be an interface for an Ethernet link, implementing any of a number of well-known protocols. Each pair of I/Os provides redundancy in the event of failure of one of the I/Os in the pair. That is, if I/O 220A fails, for example, packet processor 210 may transmit data to the link via I/O 220B. The channel connecting a pair of I/Os and packet processor 210 will now be described with respect to FIG. 3.

Figure 3:
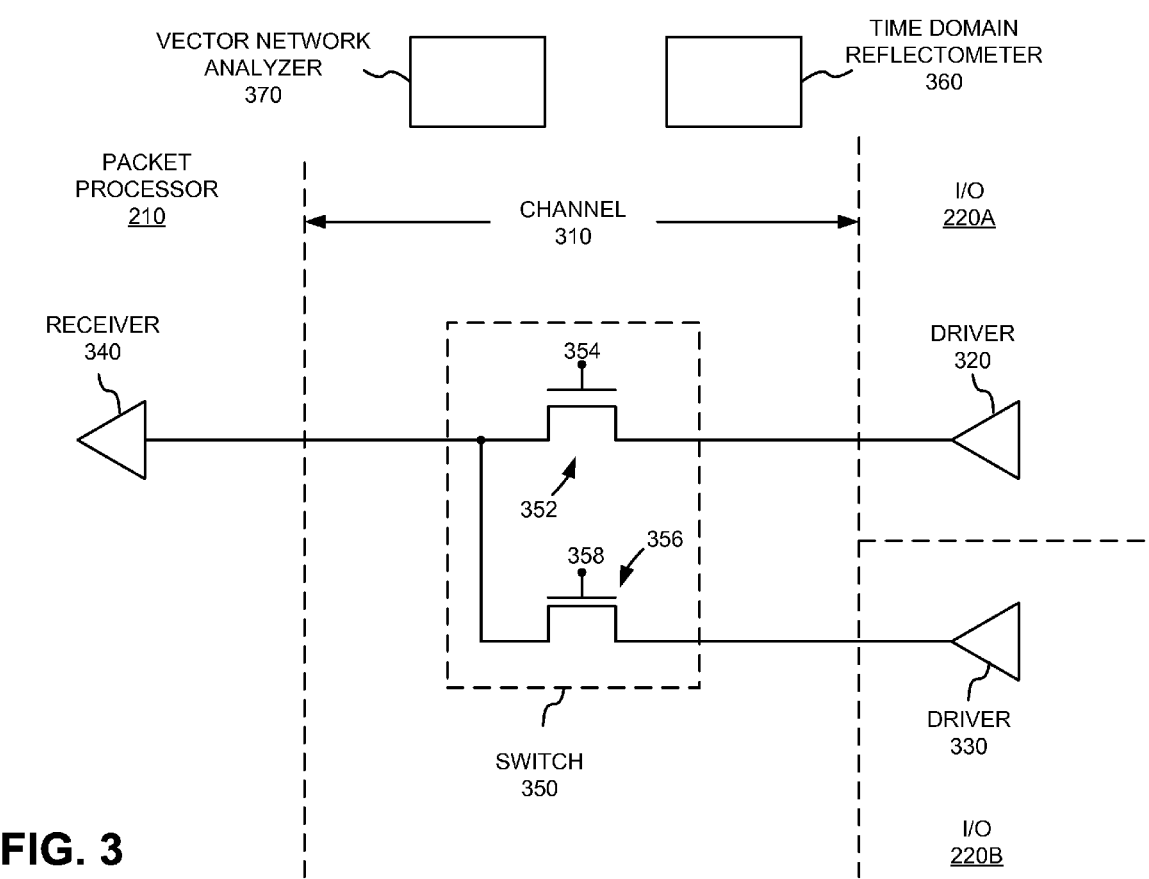
FIG. 3 is a block diagram illustrating an exemplary configuration of a channel connecting a pair of input/output interfaces (I/Os) to a packet processor in an implementation consistent with the principles of the invention.

FIG. 3 is a block diagram illustrating an exemplary configuration of a channel 310 connecting a pair of I/Os (e.g., I/Os 220A and 220B) to packet processor 210 in an implementation consistent with the principles of the invention. While the foregoing description focuses on transmitting signals from I/Os 220A and 220B to packet processor 210, it will be appreciated that the techniques described herein are equally applicable to the transmission of signals from packet processor 210 to I/Os 220A and 220B. Moreover, the links connecting I/Os 220A and 220B to packet processor 210 may be bi-directional. As such, I/Os 220A and 220B and packet processor 210 may be configured to send and receive signals.

As illustrated, each of I/Os 220A and 220B may include a driver 320 and 330, respectively, for transmitting signals to a receiver 340 of packet processor 210. Each driver 320 and 330 may include a digital finite response filter (FIR) that compensates for intersymbol interference (ISI) jitter and reflections in the transmission line connecting I/Os 220A and 220B to receiver 340.

In one implementation, channel 310 may be a high speed (e.g., 1 gigabit per second or greater), source synchronous channel. Channel 310 may include a switch 350 that acts to selectively transfer signals from one of drivers 320 and 330 based on a control signal received at switch 350. In one implementation, switch 350 may include two re-channel field effect transistors (FETs) 352 and 356. In an alternative configuration, switch 350 may include other electronic, mechanical, and/or optical switch configurations and types. The output of driver 320 connects, via a transmission line, to the drain of FET 352, while the output of driver 330 connects to the drain of FET 356 via a different transmission line. The source of each of FETs 352 and 356 connects to receiver 340 via a single transmission line.

The gates of FETs 352 and 356 may be coupled to control signals 354 and 358, respectively. In one implementation, a single control signal may be provided to the gates of FETs 352 and 356. The single control signal may be inverted for one of the gates, or alternatively, the FET pair can be configured to operate at different bias levels (e.g., one FET operating at a high level and the other FET operating at a low level). In operation, switch 350 selectively transfers signals from one of drivers 320 and 330 to receiving device 340 based on the control signal applied to the gates of FETs 352 and 356. In this way, if the primary driver (e.g., driver 320) fails, switch 350 can switch transmissions from failed driver 320 to backup driver 330.

It will be appreciated that FET switches, such as switch 350, can cause problems when operated at very high speeds (e.g., speeds on the order of 1 gigabit per second) because their associated electrical parasitics (R, L, C) represent impedance discontinuities along the channel and produce reflections on the transmission lines. For example, switch 350 may be associated with a parasitic capacitance that can result in reflection noise in channel 310. While channel 310 is shown to include a single switch 350, it will be appreciated that channel 310 may include other devices, such as connectors, vias, etc., that may also produce signal distortions (e.g., reflections) in channel 310. Moreover, due to the length of the transmission lines in channel 310 and the speed at which signals are transmitted across channel 310, different symbols (e.g., 1's and 0's) may be present at any one time along a transmission line. As the reflections are generated by the switch (and/or other devices) on the transmission line, the symbols interact with each other to produce timing uncertainties, which are commonly known as ISI jitter.

As will be described in additional detail below, the impedance discontinuities in channel 310 can be characterized in the time domain using conventional techniques. In one implementation, a time domain reflectometer 360 may be used to characterize channel 310 in the time domain. A vector network analyzer 370 may also be used to characterize channel 310 in the frequency domain. This characterization illustrates the effects of the ISI jitter on channel 310.

Figure 4:
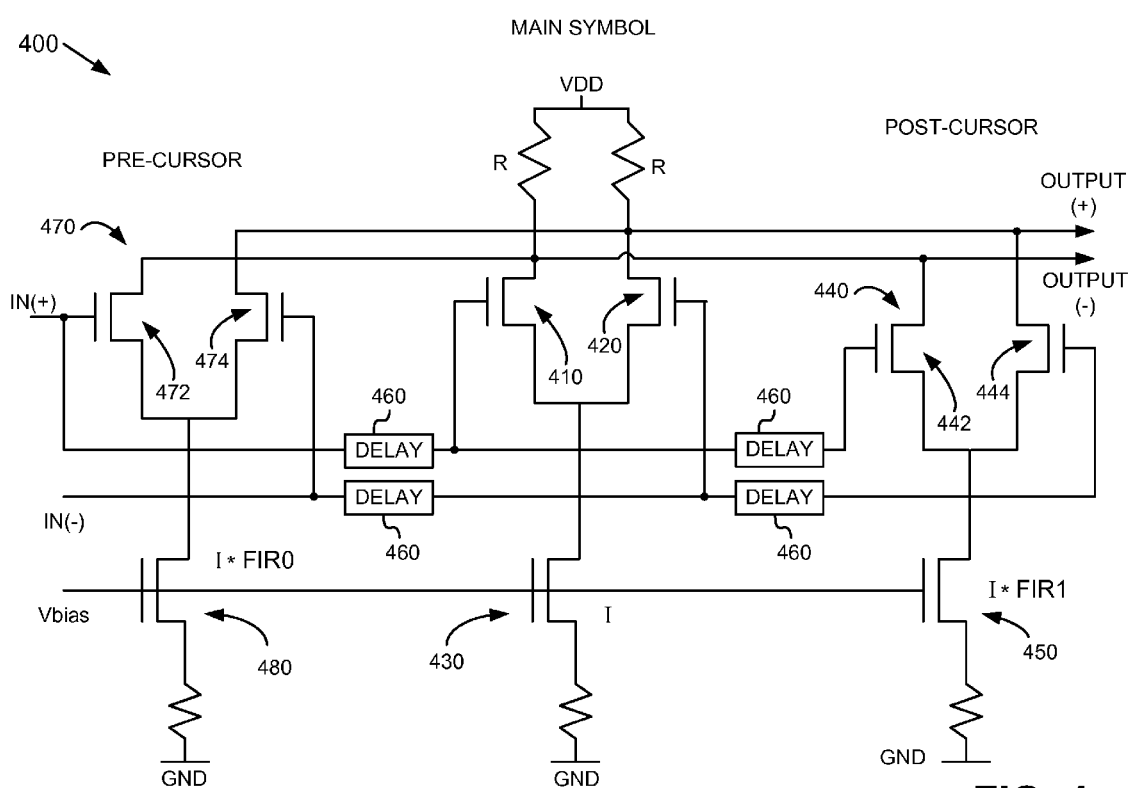
FIG. 4 is a diagram illustrating an exemplary configuration of a driver with two finite impulse response (FIR) filter taps in an implementation consistent with the principles of the invention.

To reduce the effects of ISI jitter and reflections, drivers 320 and 330 may include fractional or symbol-spaced FIR filters. In an alternative implementation, drivers 320 and 330 may include infinite impulse response (IIR) filters. The FIR filters provide pre-emphasis that acts to suppress pre-cursor and/or post-cursor symbols in channel 310. FIG. 4 is a diagram illustrating an exemplary configuration of a driver 400, which may be driver 320 or 330, with two FIR filter taps in an implementation consistent with the principles of the invention.

As illustrated, a main symbol portion of driver 400 may include a pair of re-channel FETs 410 and 420 that is connected in parallel to a voltage source VDD via resistors R. In one implementation, each resistor R may be 50Ω. The gate of FET 410 connects to a positively biased input (IN(+)) via a delay device 460 and the gate of FET 420 connects to a negatively biased input (IN(−)) via delay device 460. Delay devices 460 may cause a one symbol bit delay or fractional symbol bit delay. A current source I 430 for the main symbol may connect to the drain of FETs 410 and 420.

The post-cursor FIR filter tap portion of driver 400 includes an n-channel FET pair 440. The source of a first FET 442 of FET pair 440 connects to the negative output of the main symbol portion of driver 400. The source of a second FET 444 of FET pair 440 connects to the positive output of the main symbol portion. The drains of FETs 442 and 444 connect to a current source 450. The current from current source 450 is equivalent to the current in main symbol current source 430 multiplied by a FIR filter coefficient (FIR1). As will be described in additional detail below, the filter coefficient may have a coefficient that corresponds to an equalization in the frequency domain that is the inverse of the channel so as to reduce the effects of ISI jitter in channel 310. The gate of FET 442 connects to a positively biased input (IN(+)) via delay devices 460 and the gate of FET 444 connects to a negatively biased input (IN(−)) via delay devices 460. Delay devices 460 may cause a one symbol bit delay (or half symbol bit delay) for the post-cursor FIR filter tap.

The pre-cursor FIR filter tap portion of driver 400 includes an n-channel FET pair 470. The source of a first FET 472 of FET pair 470 connects to the negative output of the main symbol portion of driver 400. The source of a second FET 474 of FET pair 470 connects to the positive output of the main symbol portion. The drains of FETs 472 and 474 connect to a current source 480. The current from current source 480 is equivalent to the current in main symbol current source 430 multiplied by a FIR filter coefficient (FIR0). The gate of FET 472 connects to a positively biased input (IN(+)) and the gate of FET 474 connects to a negatively biased input (IN(−)).

The configuration illustrated in FIG. 4 is provided for explanatory purposes only. One skilled in the art will appreciate that other numbers of pre-cursor and post-cursor taps may be used based on channel characteristics. For example, in a 7 tap implementation, driver 400 may include 1 pre-cursor tap, a main symbol, and 5 post-cursor taps. Each post-cursor tap may be associated with a different post-cursor value (e.g., I*FIR1, I*FIR2, . . . , I*FIR5).

Exemplary Processing

To provide hardware redundancy for high speed links, such as source synchronous buses, designers often implement arrays of switches, such as switch 350, to switch between the primary and backup links. As described above, these switches 350 produce signal reflection noise along the transmission lines connecting to switches 350. The reflection noise creates voltage overshooting, undershooting, and ringing on fast edge rate signals, which are necessary for high speed links. The magnitude of the reflection noise may be significant to produce large timing uncertainties. This resultant timing uncertainty, when added to other timing uncertainties that may be present in the high speed link, such as from intersymbol interference and other noise sources, prohibits high speed operation, thus limiting the maximum speed at which the redundant high speed links can function.

Implementations consistent with the principles of the invention use digital signal processing techniques to provide equalization to cancel out reflections that are created from transistor switches and reduce ISI jitter in high speed links. Equalization may be provided at the driver. As described above, the driver may be a digital output driver with a current source n-tapped FIR filter that performs the necessary equalization. The FIR filter taps may be spaced at either integer or fractional symbol bit times and can have one or more pre-cursors, which may be either integer or fractional symbol spaced.

Figure 5:
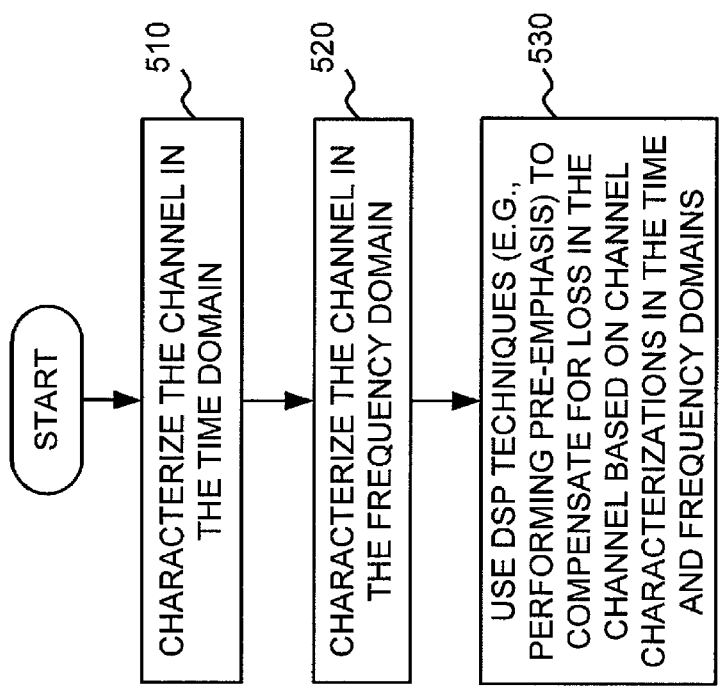
FIG. 5 illustrates an exemplary process for providing equalization in a redundant system in an implementation consistent with the principles of the invention.

FIG. 5 illustrates an exemplary process for providing equalization in a redundant system in an implementation consistent with the principles of the invention. Processing may begin by characterizing the channel, such as channel 310, in the time domain (act 510). In one implementation, time domain reflectometer 360 may be used to characterize channel 310 in the time domain. Each FET 352 and 356 represents a capacitive discontinuity over the transmission line connected thereto. Therefore, in the time domain, each FET 352 and 356 is associated with a certain impedance change ($\Delta z$) and time duration ($\Delta d$). Drivers 320 and 330 use digital signal processing techniques to compensate for these discontinuities.

Figure 6:
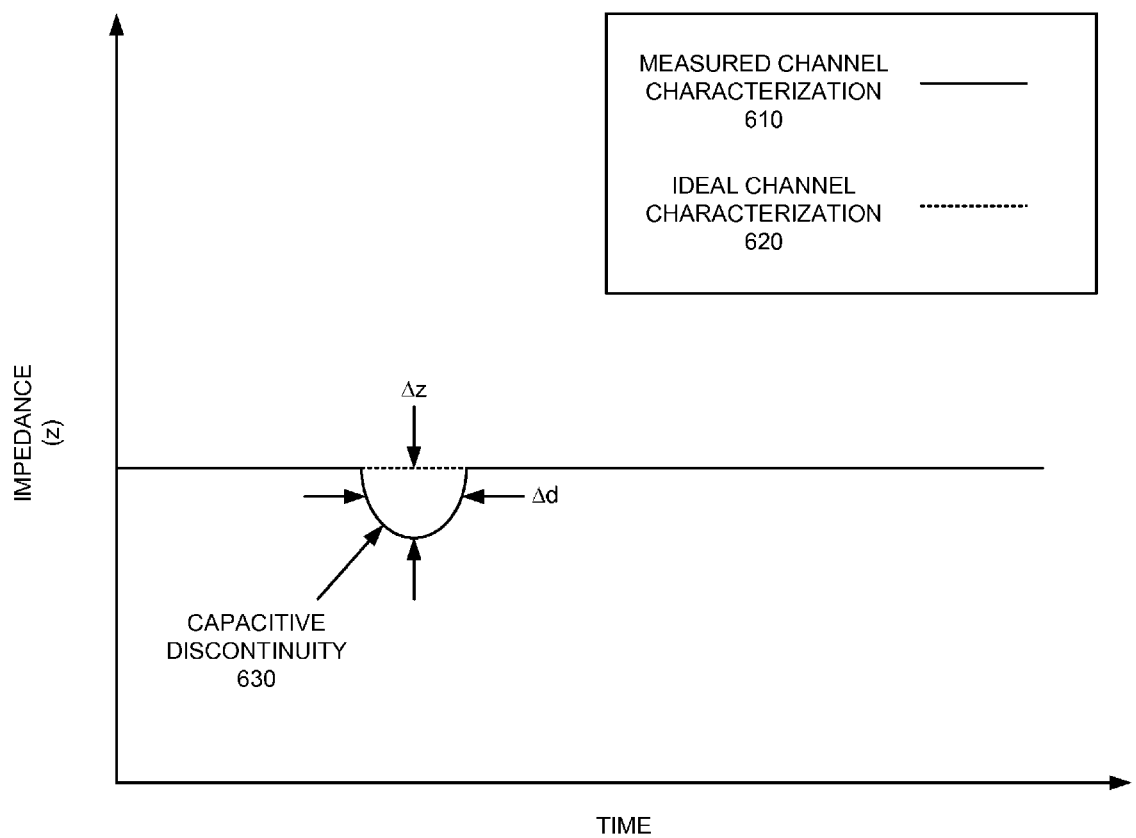
FIG. 6 is an exemplary graph of impedance versus time for the channel of FIG. 3 in an implementation consistent with the principles of the invention.

FIG. 6 is an exemplary graph of impedance (z) versus time for channel 310 in an implementation consistent with the principles of the invention. In FIG. 6, a solid line 610 represents the measured (actual) characterization of channel 310 and a dotted line 620 represents the ideal channel characterization. The ideal channel characterization is a flat line (i.e., the impedance does not vary over time). FET 352, for example, may be associated with a capacitive discontinuity 630 that may be determined, as set forth above, via the use of time domain reflectometer 360. The change in impedance ($\Delta z$) and time duration ($\Delta d$) of capacitive discontinuity 630 may be measured.

Channel 310 may be characterized in the frequency domain (act 520). In one implementation, vector network analyzer 370 may be used to determine the loss or attenuation of the signal over different frequencies. Intersymbol interference is caused when different amounts of attenuation for different frequencies are present in the signal. Vector network analyzer 370 is able to measure ISI jitter in a channel, such as channel 310.

Figure 7:
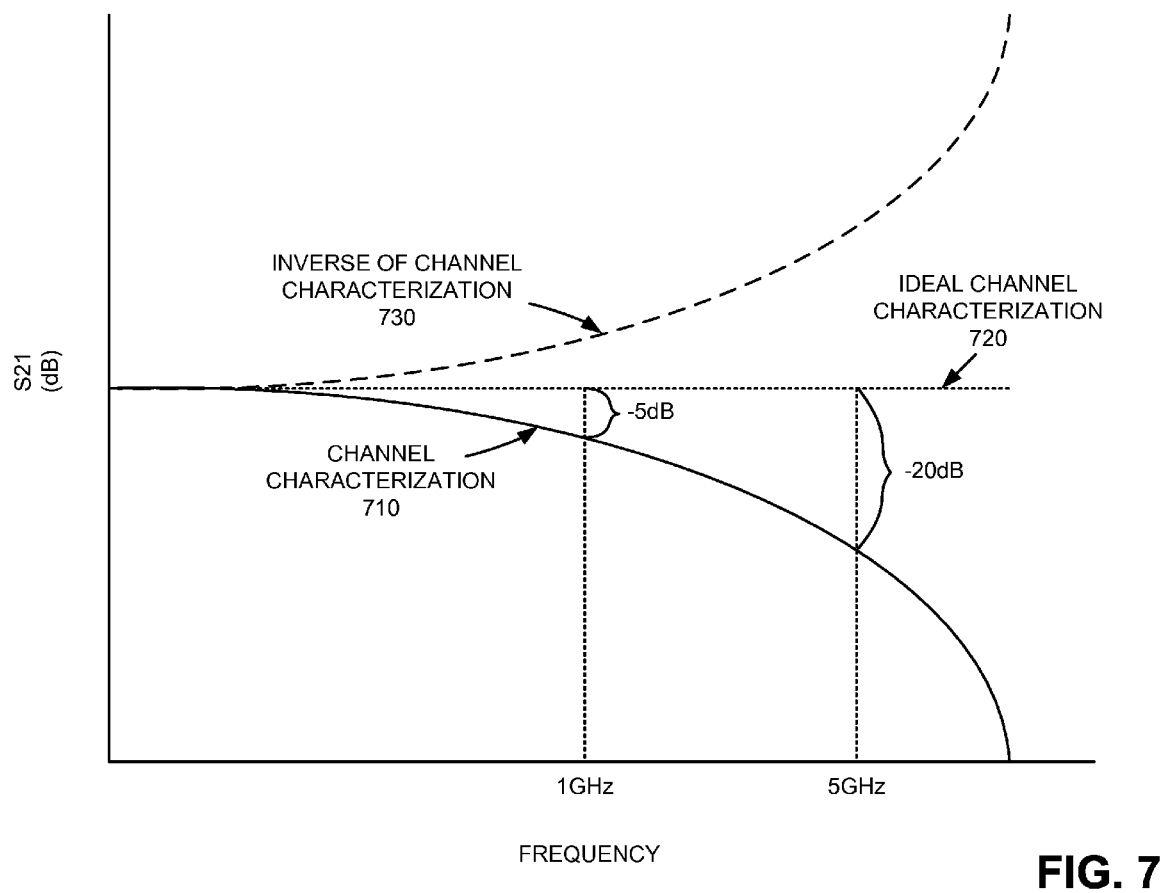
FIG. 7 is an exemplary graph of the scattering parameter S21 versus frequency for the channel of FIG. 3 in an implementation consistent with the principles of the invention.

FIG. 7 illustrates an exemplary graph of the scattering (s) parameter S21 versus frequency for channel 310 in an implementation consistent with the principles of the invention. In FIG. 7, a solid line 710 represents the measured (or actual) characterization for channel 310 in the frequency domain and a dotted line 720 represents the ideal channel characterization in the frequency domain. Flat line 720 represents no signal loss due to the channel. As shown in FIG. 7, the s parameter S21 of channel 310 decreases at higher frequencies. For example, at 1 gigahertz (GHz), channel 310 experiences a loss of approximately 5 decibels (dB). At 5 GHz, channel 310 experiences a loss of approximately 20 dB. To compensate for this loss and make channel 310 closer to ideal 720 in the frequency domain, the inverse of actual channel characterization 710 may be determined. This inverse is depicted in FIG. 7 as line 730. It will be appreciated that the sum of actual channel characterization 710 and inverse channel characterization 730 produces ideal channel characterization 720.

Once channel 310 has been characterized in the time and frequency domains, digital signal processing techniques can be used to compensate for the loss (impedance discontinuities and ISI jitter) in channel 310 (act 530). In one implementation, current source n-tapped FIR filters are used in the drivers (i.e., drivers 320 and 330) to compensate for these channel effects. The FIR filter taps may be spaced at either integer or fractional symbol bit times and can have one or more pre-cursors, which can be either integer or fractional symbol spaced.

The FIR filter coefficients may be determined based on the characteristics of channel 310. The FIR filter coefficients have an equalization in the frequency domain that is the inverse of the channel (line 730 in FIG. 7). Therefore, when multiplied in the frequency domain, ideal channel characterization 720 is obtained. Moreover, when the convolution of the FIR filter coefficients is taken in the time domain, ideal channel characterization 620 is obtained.

Figure 8:
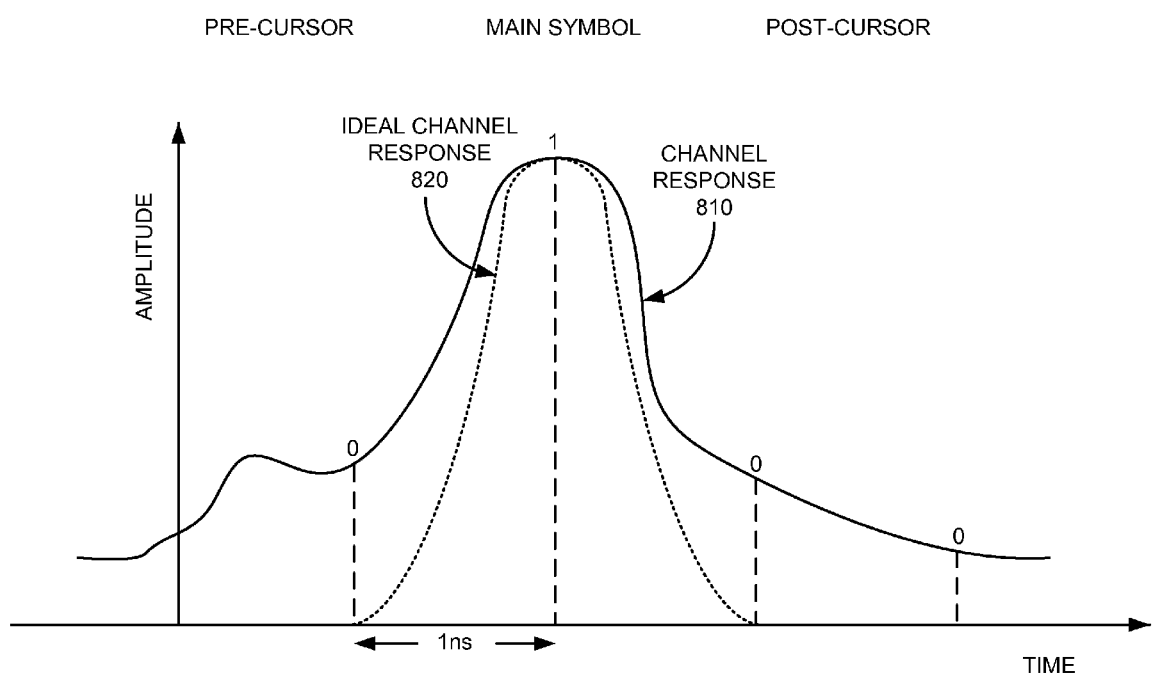
FIG. 8 is an exemplary channel response in an implementation consistent with the principles of the invention.

FIG. 8 is an exemplary channel response in an implementation consistent with the principles of the invention. Line 810 in FIG. 8 represents the channel response for channel 310, which may be obtained via an Inverse Fast Fourier Transform operation. Line 820 represents the ideal channel response (i.e., the channel response if channel 310 was lossless). Channel response 810 includes a main symbol portion (represented by a "1"), and post-cursor and pre-cursor portions which contain residue from the main symbol. The symbols in the post-cursor and pre-cursor portions are represented by a "0" in FIG. 8. The FIR filter taps may be integer symbol spaced (e.g., spaced 1 nanosecond apart) or fractional symbol spaced to suppress the energy in those adjacent symbols following the main symbol (post-cursor) and those preceding the main symbol (pre-cursor).

For power and chip area and electrical parasitics reasons, large numbers of FIR filter taps are undesirable to implement. To prevent the need for excessively large numbers of FIR filter taps, two techniques may be implemented. In a first technique, the transmission line lengths between drivers 320 and 330 and switch 350 and between switch 350 and receiver 340 are constrained so that the channel characteristics are bounded and deterministic. For example, in the exemplary configuration illustrated in FIG. 3, the transmission line lengths between each driver 320 and 330 and switch 350 and the transmission line lengths between switch 350 and receiver 340 may be constrained and controlled to make channel 310 deterministic. Knowing the channel characteristics enables an optimal design of the digital FIR filter, and its corresponding number of taps and tap coefficients.

In a second technique, the FIR filter taps may be moved simultaneously by integer multiples of the symbol bit delay times. By positioning the grouped FIR filter taps at the bit time impulse response time aberrations based on the known channel characteristics, the number of optimal FIR filter taps can be dramatically reduced (e.g., by one quarter).

Conclusion

Systems and methods consistent with the principles of the invention provide equalization to compensate for reflections and frequency dependent dispersions (i.e., ISI jitter) in redundant, high speed links. Exemplary implementations perform pre-emphasis to greatly reduce signal distortions in the high speed links caused by the presence of one or more FET switches in the high speed links.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, while the above description described the high speed links as being source synchronous, implementations consistent with the principles of the invention are equally applicable to non-source synchronous links (e.g., asynchronous links).

Moreover, while a series of acts was described with respect to FIG. 5, the order of the acts may differ in other implementations consistent with the principles of the invention. Also, non-dependent acts may be performed in parallel.

No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed is:

1. A network device comprising:
   redundant drivers to transmit signals to a receiver; and
   a channel to:
     transfer signals from one of the redundant drivers to the receiver, the channel causing distortions in the signals transmitted by the redundant drivers,
   where each of the redundant drivers is to:
     compensate for the distortions caused by the channel.

2. The network device of claim 1, where the channel includes high speed links, and
   where the channel causes reflections and intersymbol interference (ISI) jitter in the high speed links.

3. The network device of claim 2, where each redundant driver, of the redundant drivers, includes a digital finite impulse response (FIR) filter to compensate for the reflections and the ISI jitter.

4. The network device of claim 1, where the channel includes:
a field effect transistor (FET) switch, and
high speed links.

5. The network device of claim 4, where the FET switch includes two or more FETs.

6. The network device of claim 4, where the high speed links include source synchronous buses.

7. The network device of claim 1, where each redundant driver, of the redundant drivers, includes:
one or more pre-cursor portions to compensate for pre-cursor symbols in the channel,
a main symbol portion, and
one or more post-cursor portions to compensate for post-cursor symbols in the channel,
where the main symbol portion connects to the one or more pre-cursor portions and the one or more post-cursor portions.

8. The network device of claim 7, where each pre-cursor portion includes a first n-channel field effect transistor (FET) and a second n-channel FET,
where the main symbol portion includes a third n-channel FET and a fourth n-channel FET, and
where each post-cursor portion includes a fifth n-channel FET and a sixth n-channel FET.

9. The network device of claim 8, where a source of the first FET connects to a negative output of the main symbol portion and a drain of the first FET connects to a current source,
where a source of the second FET connects to a positive output of the main symbol portion and a drain of the second FET connects to the current source,
where a source of the fifth FET connects to the negative output of the main symbol portion and a drain of the fifth FET connects to the current source, and
where a source of the sixth FET connects to the positive output of the main symbol portion and a drain of the sixth FET connects to the current source.

10. A network device comprising:
a first driver to transmit signals to a receiver, the first driver including:
a first fractional or symbol-spaced finite impulse response filter;
a second driver to transmit signals to the receiver, the second driver including:
a second fractional or symbol-spaced finite impulse response filter; and
a channel that connects the first driver and the second driver to the receiver, the channel to:
transfer signals from one of the first driver or the second driver, the channel causing distortions in the signals transmitted by the one of the first driver or the second driver,
where the first fractional or symbol-spaced finite impulse response filter and the second fractional or symbol-spaced finite impulse response filter are to:
compensate for the distortions caused by the channel.

11. The network device of claim 10, where the first fractional or symbol-spaced finite impulse response filter and the second fractional or symbol-spaced finite impulse response filter include at least one post-cursor tap and at least one pre-cursor tap.

12. The network device of claim 11, where, when compensating for the distortions caused by the channel, each of the finite impulse response filter post-cursor taps is spaced at one of integer symbol bit times and fractional symbol bit times and each of the pre-cursor taps is spaced at one of integer symbol bit times and fractional symbol bit times.

13. The network device of claim 10, where the channel includes:
a field effect transistor (FET) switch, and
high speed links,
where, when compensating for the distortions, the first fractional or symbol-spaced finite impulse response filter and the second fractional or symbol-spaced finite impulse response filter are to:
compensate for the distortions based on characterizations of the high speed links in time and frequency domains.

14. The network device of claim 13, where the characterization of the high speed links in the time domain includes a measurement of an impedance of the high speed links over time.

15. The network device of claim 13, where the characterization of the high speed links in the frequency domain includes a measurement of a scattering parameter versus frequency.

16. A method comprising:
transmitting, by redundant drivers, signals to a receiver;
transferring, by a channel that connects the receiver and the redundant drivers, signals from one of the redundant drivers, the channel causing distortions to the signals; and
compensating, by each of the redundant drivers, for the distortions caused by the channel.

17. The method of claim 16, where the channel includes high speed links, and
where the channel causes reflections and intersymbol interference (ISI) jitter in the high speed links.

18. The method of claim 16, where the channel includes high speed links, and where the compensating includes:
compensating for the distortions based on characterizations of the high speed links in time and frequency domains.

19. The method of claim 18, where the characterization of the high speed links in the time domain includes a measurement of an impedance of the high speed links over time.

20. The method of claim 18, where the characterization of the high speed links in the frequency domain includes a measurement of a scattering parameter versus frequency.

* * * * *